(12) United States Patent
Ito et al.

(10) Patent No.: US 9,469,050 B2
(45) Date of Patent: Oct. 18, 2016

(54) SEPARATION DEVICE

(71) Applicant: DAIKI CO., LTD., Tokyo (JP)

(72) Inventors: Hiroshi Ito, Tokyo (JP); Shinobu Hatanaka, Tochigi (JP); Junji Yoshinaga, Tokyo (JP); Hiroyuki Ando, Kagawa (JP)

(73) Assignee: DAIKI CO., LTD., Tokyo (JP)

( * ) Notice: Subject to any disclaimer, the term of this patent is extended or adjusted under 35 U.S.C. 154(b) by 0 days.

(21) Appl. No.: 14/746,461

(22) Filed: Jun. 22, 2015

(65) Prior Publication Data

US 2015/0283734 A1 Oct. 8, 2015

Related U.S. Application Data

(63) Continuation of application No. PCT/JP2013/053702, filed on Feb. 15, 2013.

(51) Int. Cl.
*B02C 23/10* (2006.01)
*B29B 17/02* (2006.01)
(Continued)

(52) U.S. Cl.
CPC ............... *B29B 17/02* (2013.01); *B02C 23/10* (2013.01); *B07B 1/24* (2013.01); *B07B 15/00* (2013.01); *B09B 3/00* (2013.01); *B09B 5/00* (2013.01); *B29B 17/0412* (2013.01); *B29B 17/04* (2013.01); *B29B 2017/0224* (2013.01); *B29L 2031/4878* (2013.01); *Y02W 30/622* (2015.05); *Y02W 30/625* (2015.05)

(58) Field of Classification Search
CPC .............. B29B 17/02; B29B 17/0412; B29B 2017/0224; B02C 23/10; B07B 15/00
USPC .......................................................... 241/76
See application file for complete search history.

(56) References Cited

U.S. PATENT DOCUMENTS 4,500,040 A * 2/1985 Steffens .................. B29B 17/02
241/14
2009/0032626 A1* 2/2009 Armstrong .............. B03B 9/061
241/19

FOREIGN PATENT DOCUMENTS

DE        2704035 A1 *  8/1978  ............. B29B 17/02
JP        H06-230606 A    8/1994
(Continued)

OTHER PUBLICATIONS

May 14, 2013 Written Opinion issued in International Application No. PCT/JP2013/053702.
(Continued)

*Primary Examiner* — Mark Rosenbaum
(74) *Attorney, Agent, or Firm* — Oliff PLC

(57) ABSTRACT

A separation device includes a first shredding unit, a first separation unit, and a first air pipe. The first shredding unit shreds a processing target containing a first material and a second material. The first separation unit rotates a first tubular portion in a state in which the processing target shredded by the first shredding unit is accommodated therein, thereby separating the second material passing through first holes from the processing target. The first air pipe transfers the processing target shredded by the first shredding unit to the first separation unit with air pressure. The first air pipe has a first portion that extends in a first direction, and a second portion that is connected to the first portion on a downstream side of the first portion and that extends in a second direction substantially orthogonal to the first direction.

13 Claims, 13 Drawing Sheets

(51) Int. Cl.
    *B07B 1/24*     (2006.01)
    *B07B 15/00*     (2006.01)
    *B09B 3/00*     (2006.01)
    *B09B 5/00*     (2006.01)
    B29L 31/48     (2006.01)
    B29B 17/04     (2006.01)

(56) References Cited

FOREIGN PATENT DOCUMENTS

| | | | |
|---|---|---|---|
| JP | H06-285431 A | 10/1994 | |
| JP | H08-117688 A | 5/1996 | |
| JP | 2000-350944 A | 12/2000 | |
| JP | 2008-266109 A | 11/2008 | |

OTHER PUBLICATIONS

May 14, 2013 Written Opinion issued in International Application No. PCT/JP2013/053701.
May 14, 2013 Written Opinion issued in International Application No. PCT/JP2013/053703.
U.S. Appl. No. 14/746,249, filed Jun. 22, 2015 in the name of Ito et al.
U.S. Appl. No. 14/745,847, filed Jun. 22, 2015 in the name of Ito et al.
May 14, 2013 Search Report issued in International Application No. PCT/JP2013/053702.
May 14, 2013 Search Report issued in International Application No. PCT/JP2013/053701.
May 14, 2013 Search Report issued in International Application No. PCT/JP2013/053703.

\* cited by examiner

SEPARATION DEVICE

CROSS REFERENCE TO RELATED APPLICATION

This is a Continuation of International Application No. PCT/JP2013/053702 filed Feb. 15, 2013. The contents of this application are hereby incorporated by reference in their entirety.

TECHNICAL FIELD

The present invention relates to a separation device.

BACKGROUND ART

An example of conventional separation devices is disclosed in Patent Document 1. In the separation device disclosed in this document, first, a defective piece of disposable diaper or the like in which a water-absorbent member is filled in an exterior material is cut into pieces of a predetermined size by a cutter. Then, the cut pieces are fed into a separator by pneumatic conveyance.

The separator has a rotational shaft that is provided so as to be rotatable about its axis and a cylindrical mesh unit that surrounds the rotational shaft and that is provided so as to be rotatable concentrically with the rotational shaft in an opposite direction. The rotational shaft is provided with a plurality of stirring rods that are disposed radially. The cut pieces that are fed into this separator are divided into the exterior material and the water-absorbent member by the rotational axis and the cylindrical mesh unit rotating in mutually opposite directions. The water-absorbent member is sifted out by meshes of the cylindrical mesh unit.
Patent Document 1: JP H8-117688A

SUMMARY OF INVENTION

Technical Problem

As described above, according to this separation device, a water-absorbent resin or the like can be separated from a defective piece of disposable diaper or the like. However, conventional separation devices have room for improvement in terms of separation efficiency.

Solution to Problem

The present invention was made in view of the above-described problems, and it is an object thereof to provide a separation device having a high separation efficiency.

A separation device according to the present invention includes a first shredding unit that shreds a processing target containing a first material and a second material adhering to the first material, a first separation unit that has a first tubular portion in which a large number of first holes that allow the second material contained in the processing target shredded by the first shredding unit to pass through without allowing the first material to pass through are formed, and that separates the second material passing through the first holes from the processing target by rotating the first tubular portion in a state in which the processing target shredded by the first shredding unit is accommodated in the first tubular portion, and a first air pipe for transferring the processing target shredded by the first shredding unit to the first separation unit with air pressure, wherein the first air pipe has a first portion that extends in a first direction and a second portion that is connected to the first portion on a downstream side of the first portion and that extends in a second direction substantially orthogonal to the first direction.

In this separation device, the processing target containing the first material and the second material adhering to the first material is shredded by the first shredding unit. The processing target shredded by the first shredding unit is transferred to the first separation unit through the first air pipe with air pressure. In the first separation unit, the first tubular portion is rotated, and thus the second material dissociated from the first material is discharged to the outside of the first tubular portion through the first holes. As a result, the second material is separated from the processing target.

Here, the first air pipe has the first portion and the second portion that are orthogonal to each other. Thus, the processing target transferred by air pressure collides with the inner surface of the first air pipe in the connecting portion between the first portion and the second portion. The impact of this collision promotes dissociation of the second material from the first material. This contributes to an improvement in the separation efficiency of the separation device. Here, the separation efficiency refers to the ratio of the weight of the second material that is separated from the processing target to the weight of the second material that is contained in the processing target immediately before the processing.

Advantageous Effects of Invention

According to the present invention, a separation device having a high separation efficiency is realized.

DESCRIPTION OF EMBODIMENTS

Figure 1:
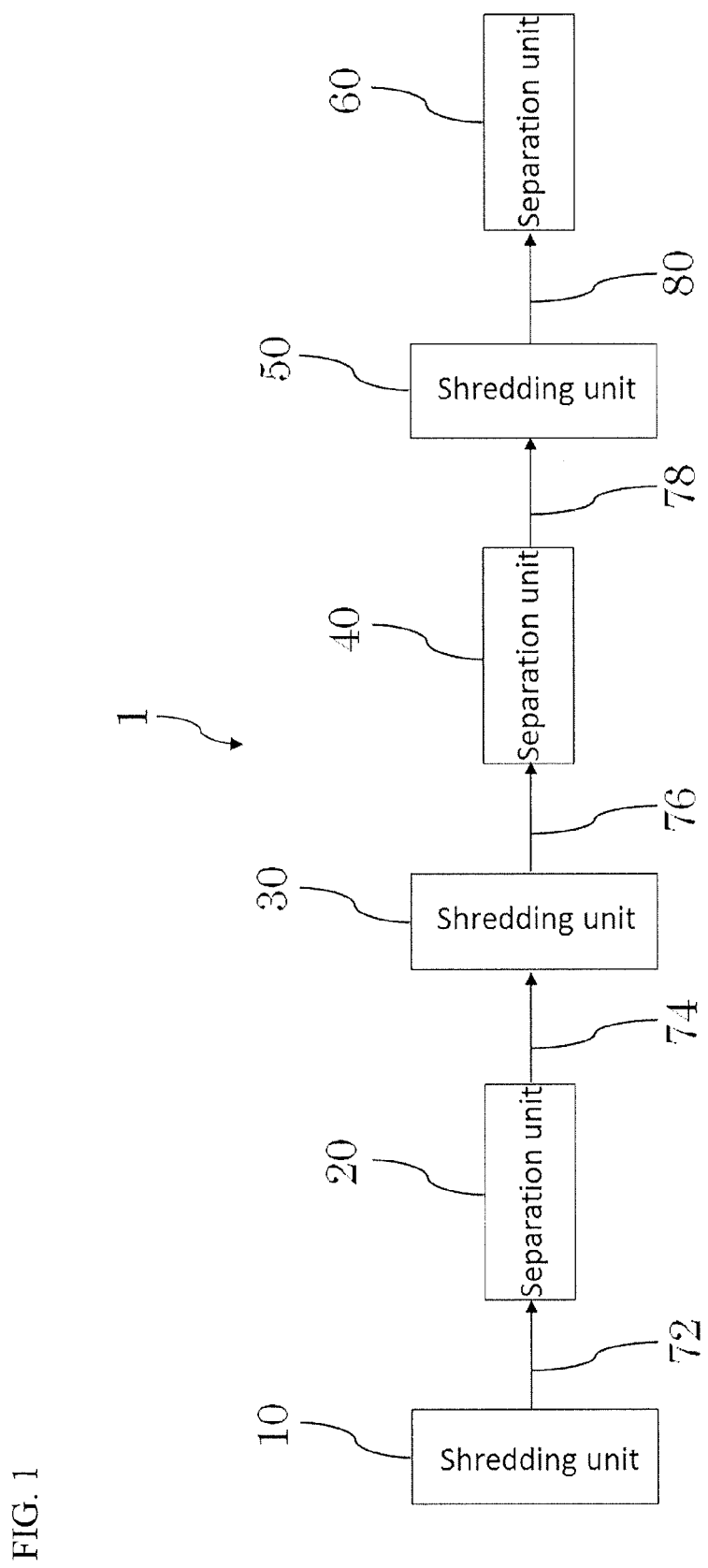
FIG. 1 is a configuration diagram showing an embodiment of a separation device according to the present invention.

Hereinafter, embodiments of the present invention will be described in detail with reference to the drawings. It should be noted that the description of the drawings denotes like elements by like reference numerals and omits redundant descriptions.

FIG. 1 is a configuration diagram showing an embodiment of a separation device according to the present invention. A separation device 1 processes a processing target containing a first material and a second material adhering to the first material, thereby dissociating the second material from the first material and separating the second material from the processing target. The processing target may be a defective piece of disposable diaper or sanitary napkin, for example. The present embodiment will be described using a case where the processing target is a disposable diaper, the first material is a plastic, and the second material is a water-absorbent polymer (including a highly water-absorbent polymer) as an example.

The separation device 1 includes a shredding unit 10 (second shredding unit), a separation unit 20 (second separation unit), a shredding unit 30 (first shredding unit), a separation unit 40 (first separation unit), a shredding unit 50 (third shredding unit), and a separation unit 60 (third separation unit).

The shredding unit 10 shreds a disposable diaper containing a plastic and a water-absorbent polymer adhering to the plastic into fragments. For example, a crusher or a grinder can be used as the shredding unit 10. Preferably, no screen is provided in the shredding unit 10.

Figure 2:
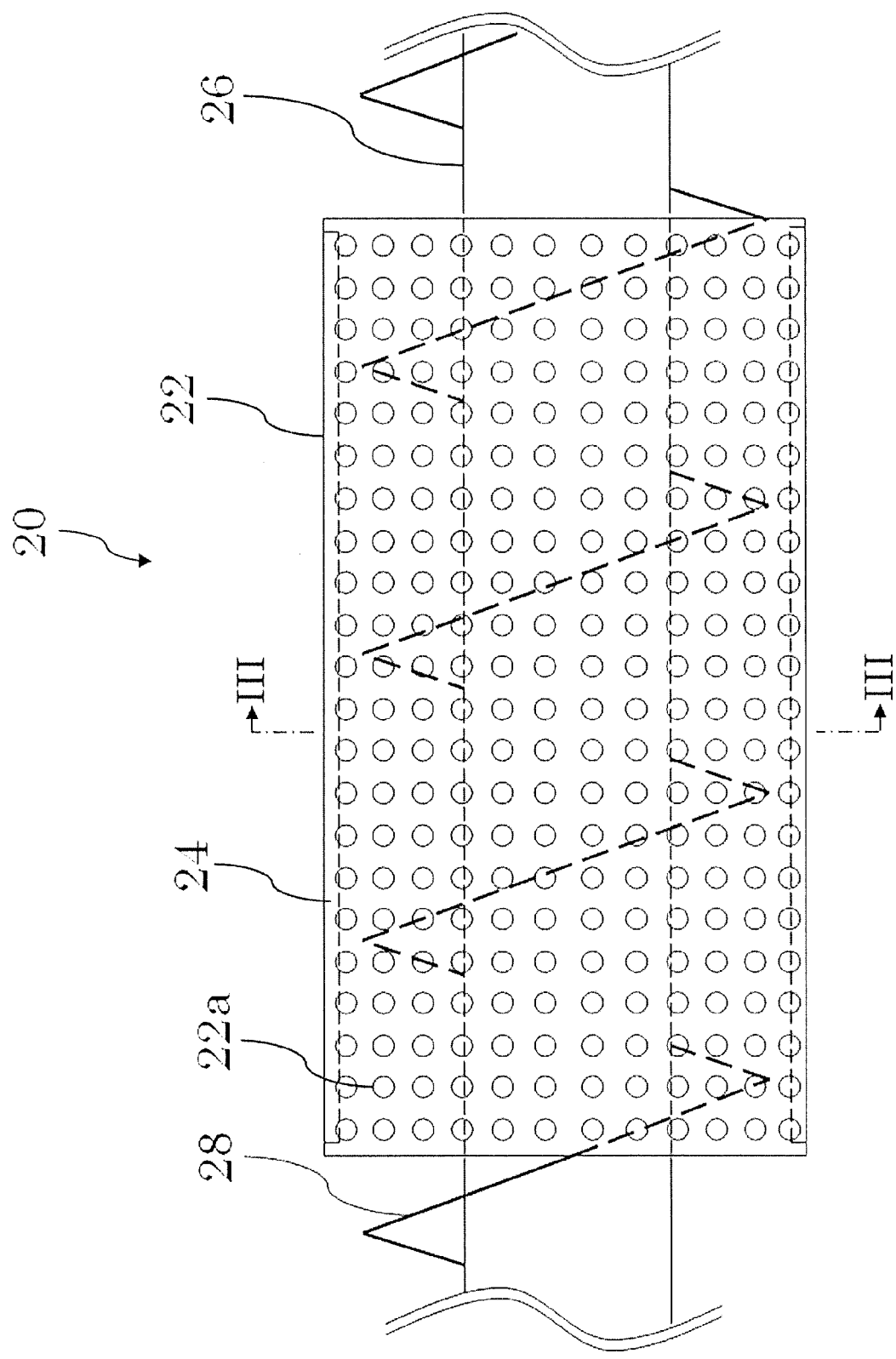
FIG. 2 is a side view showing a separation unit 20 of the separation device in FIG. 1.
Figure 3:
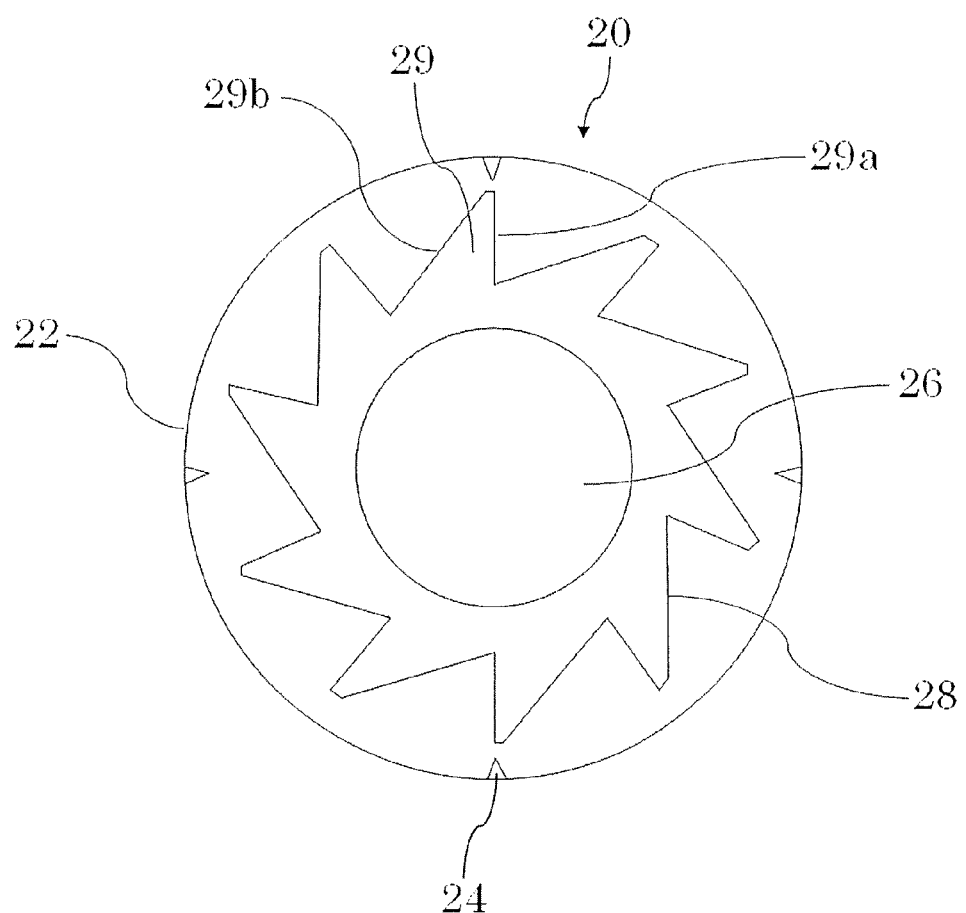
FIG. 3 is a cross-sectional view taken along line III-III in FIG. 2.

The structure of the separation unit 20 will be described with reference to FIGS. 2 and 3. FIG. 2 is a side view showing the separation unit 20. FIG. 3 is a cross-sectional view taken along line in FIG. 2. The separation unit 20 has a drum 22 (second tubular portion). The drum 22 has a substantially cylindrical tubular shape and is provided so as to be rotatable about its central axis. The central axis of the drum 22 extends horizontally. The inner diameter of the drum 22 may be between 30 cm and 50 cm inclusive, for example.

A large number of holes 22a (second holes) are formed in the drum 22. The holes 22a are formed over substantially the entire drum 22. The holes 22a do not allow the plastic contained in the disposable diaper fragments shredded by the shredding unit 10 to pass through, but allow the water-absorbent polymer to pass through. The diameter of the holes 22a may be between 10 mm and 30 mm inclusive, for example. The separation unit 20 rotates the drum 22 in a state in which the disposable diaper fragments shredded by the shredding unit 10 are accommodated therein, thereby separating the water-absorbent polymer passing through the holes 22a from the disposable diaper fragments.

A ridge 24 (second ridge) is formed on an inner circumferential surface of the drum 22. The ridge 24 extends in a direction in which the central axis of the drum 22 extends. The ridge 24 extends over substantially the entire path from an inlet side (left side of FIG. 2) to an outlet side (right side of FIG. 2) of the drum 22. Also, the ridge 24 has a substantially triangular cross-sectional shape. The height of the ridge 24 (length in a radial direction of the drum 22) may be between 5 mm and 2 cm inclusive, for example. Preferably, "q" (q: an integer between 3 and 5 inclusive) ridges 24 are provided. The "q" ridges 24 are arranged on the inner circumferential surface of the drum 22 at regular intervals. That is to say, in a cross section (cross section shown in FIG. 3) that is perpendicular to the central axis of the drum 22, an angle α that is formed by a line connecting one ridge 24 to the central axis and a line connecting the next ridge 24 to the central axis is substantially equal to 360°/q. In the present embodiment, q=4 and α=90°.

A rotating rod 26 and a screw member 28 are provided inside the drum 22. The rotating rod 26 has a substantially cylindrical shape and is provided so as to be rotatable about its central axis. The central axis of the rotating rod 26 coincides with the central axis of the drum 22. However, the rotating rod 26 rotates independently of the drum 22. The outer diameter of the rotating rod 26 may be between 15 cm and 25 cm inclusive, for example.

The screw member 28 is helically provided around the rotating rod 26. The screw member 28 is fixed to the rotating rod 26 and rotates together with the rotating rod 26. A plurality of teeth 29 are formed in the screw member 28. An end portion of each tooth 29 is constituted by a side 29a and a side 29b in a front view (see FIG. 3).

The side 29a extends in the radial direction of the drum 22 and the rotating rod 26. An inner end (end that is closer to the rotating rod 26) of the side 29a is located at a position spaced apart from the rotating rod 26. Similarly, an outer end (end that is closer to the drum 22) of the side 29a is located at a position spaced apart from the drum 22. The distance from the outer end of the side 29a to the inner circumferential surface of the drum 22 is larger than the height of the ridge 24 and may be between 1 cm and 3 cm inclusive, for example. The side 29b connects the outer end of the side 29a to the inner end of the side 29a of the next tooth 29. The side 29b is longer than the side 29a. The ratio of the length of the side 29b to the length of the side 29a may be between 2 and 2.5 inclusive, for example.

The rotating rod 26 and the screw member 28 rotate in a left-handed direction (counterclockwise) in FIG. 3. That is to say, in each tooth 29, the side 29b is located on a forward side with respect to the rotation direction, and the side 29a is located on a rearward side with respect to the rotation direction. The rotation direction of the drum 22 described above may be the same as the rotation direction of the rotating rod 26 and the screw member 28 or may be opposite to this rotation direction. In the case where these rotation directions are the same, it is preferable that the rotation speed of the rotating rod 26 and the screw member 28 is greater than the rotation speed of the drum 22.

The shredding unit 30 shreds the disposable diaper fragments from which the water-absorbent polymer passing through the holes 22a has been separated by the separation unit 20. For example, a crusher or a grinder can be used as the shredding unit 30. A screen is provided in the shredding unit 30. The hole diameter of the screen may be between 30 mm and 70 mm inclusive, for example.

Figure 4:
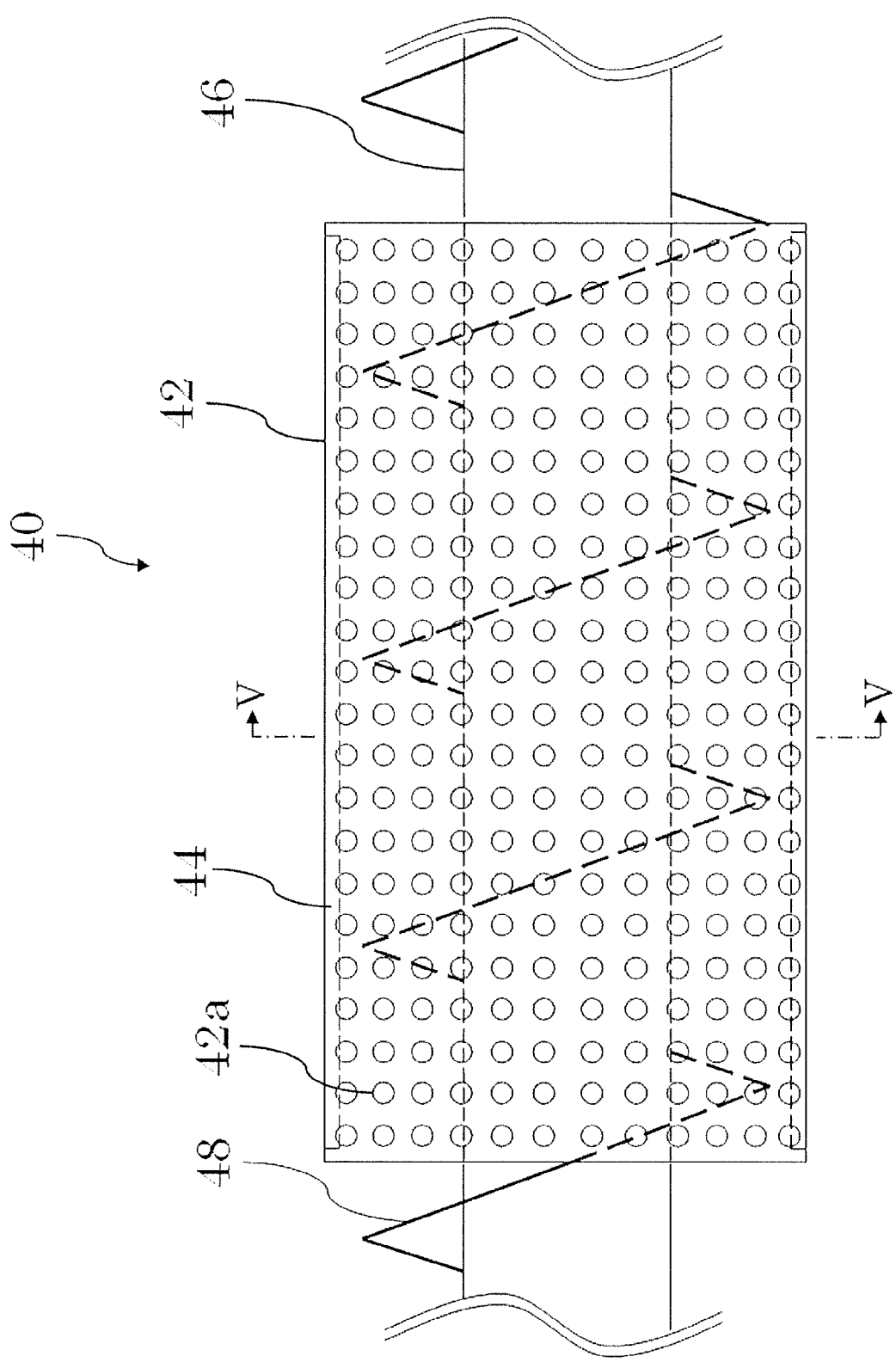
FIG. 4 is a side view showing a separation unit 40 of the separation device in FIG. 1.
Figure 5:
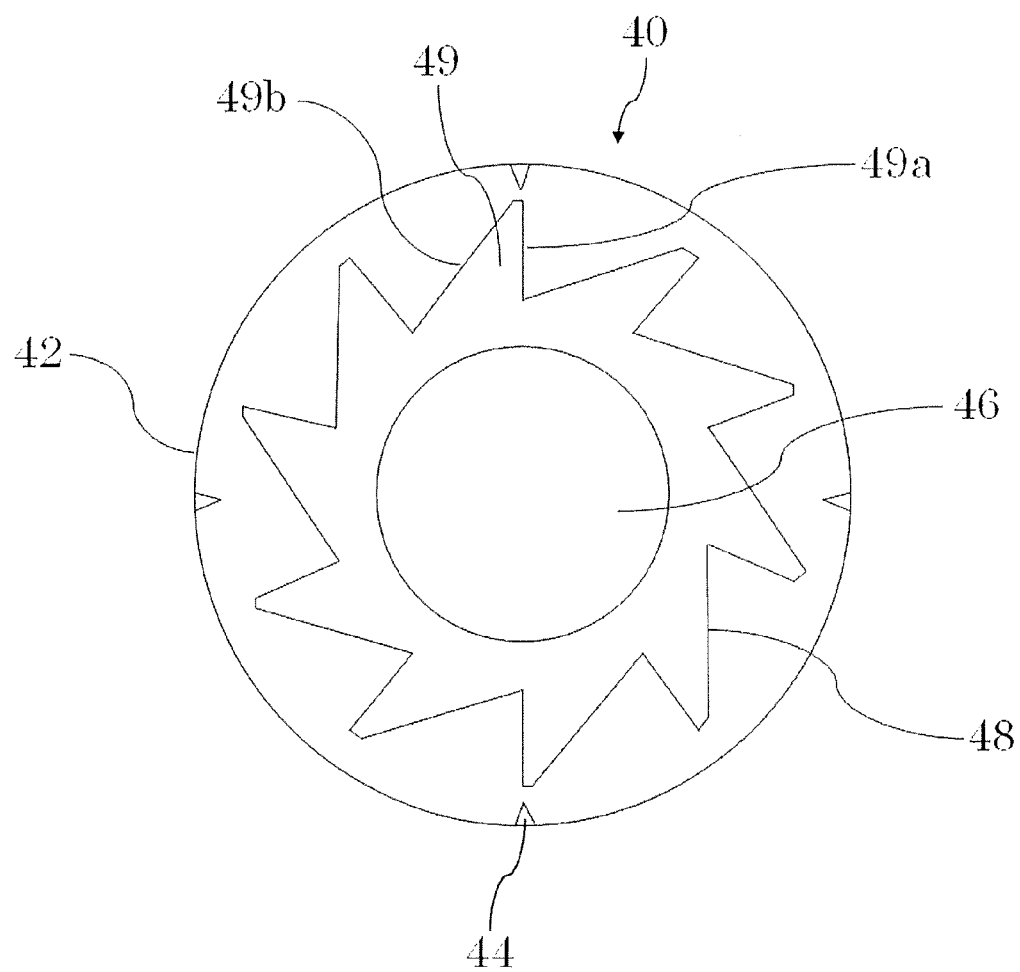
FIG. 5 is a cross-sectional view taken along line V-V in FIG. 4.

The structure of the separation unit 40 will be described with reference to FIGS. 4 and 5. FIG. 4 is a side view showing the separation unit 40. FIG. 5 is a cross-sectional view taken along line V-V in FIG. 4. The separation unit 40 has a drum 42 (first tubular portion). The drum 42 has a substantially cylindrical tubular shape and is provided so as to be rotatable about its central axis. The central axis of the drum 42 extends horizontally. The inner diameter of the drum 42 may be between 30 cm and 50 cm inclusive, for example.

A large number of holes 42a (first holes) are formed in the drum 42. The holes 42a are formed over substantially the entire drum 42. The holes 42a do not allow the plastic contained in the disposable diaper fragments shredded by the shredding unit 30 to pass through, but allow the water-absorbent polymer to pass through. The area of each of the holes 42a in a plan view is smaller than the area of each of the holes 22a in a plan view. The diameter of the holes 42a may be between 5 mm and 20 mm inclusive, for example. The separation unit 40 rotates the drum 42 in a state in which the disposable diaper fragments shredded by the shredding unit 30 are accommodated therein, thereby separating the water-absorbent polymer passing through the holes 42a from the disposable diaper fragments.

A ridge 44 (first ridge) is formed on an inner circumferential surface of the drum 42. The ridge 44 extends in a direction in which the central axis of the drum 42 extends. The ridge 44 extends over substantially the entire path from an inlet side (left side of FIG. 4) to an outlet side (right side of FIG. 4) of the drum 42. Also, the ridge 44 has a substantially triangular cross-sectional shape. The height (length in the radial direction of the drum 42) of the ridge 44 may be between 5 mm and 2 cm inclusive, for example. Preferably, "p" (p: an integer between 3 and 5 inclusive) ridges 44 are provided. The "p" ridges 44 are arranged on the inner circumferential surface of the drum 42 at regular intervals. That is so say, in a cross section (cross section shown in FIG. 5) that is perpendicular to the central axis of the drum 42, an angle β that is formed by a line connecting one ridge 44 to the central axis and a line connecting the next ridge 44 to the central axis is substantially equal to 360°/p. In the present embodiment, p=4 and β=90°.

A rotating rod 46 and a screw member 48 are provided inside the drum 42. The rotating rod 46 has a substantially cylindrical shape and is provided so as to be rotatable about its central axis. The central axis of the rotating rod 46 coincides with the central axis of the drum 42. However, the rotating rod 46 rotates independently of the drum 42. The outer diameter of the rotating rod 46 may be between 15 cm and 25 cm inclusive, for example.

The screw member 48 is helically provided around the rotating rod 46. The screw member 48 is fixed to the rotating rod 46 and rotates together with the rotating rod 46. A plurality of teeth 49 are formed in the screw member 48. An end portion of each tooth 49 is constituted by a side 49a and a side 49b in a front view (see FIG. 5).

The side 49a extends in the radial direction of the drum 42 and the rotating rod 46. An inner end (end that is closer to the rotating rod 46) of the side 49a is located at a position spaced apart from the rotating rod 46. Similarly, an outer end (end that is closer to the drum 42) of the side 49a is located at a position spaced apart from the drum 42. The distance from the outer end of the side 49a to the inner circumferential surface of the drum 42 is larger than the height of the ridge 44 and may be between 1 cm and 3 cm inclusive, for example. The side 49b connects the outer end of the side 49a to the inner end of the side 49a of the next tooth 49. The side 49b is longer than the side 49a. The ratio of the length of the side 49b to the length of the side 49a may be between 2 and 2.5 inclusive, for example.

The rotating rod 46 and the screw member 48 rotate in a left-handed direction (counterclockwise) in FIG. 5. That is to say, in each tooth 49, the side 49b is located on the forward side with respect to the rotation direction, and the side 49a is located on the rearward side with respect to the rotation direction. The rotation direction of the drum 42 described above may be the same as the rotation direction of the rotating rod 46 and the screw member 48 or may be opposite to this rotation direction. In the case where these rotation directions are the same, it is preferable that the rotation speed of the rotating rod 46 and the screw member 48 is greater than the rotation speed of the drum 42.

The shredding unit 50 shreds the disposable diaper fragments from which the water-absorbent polymer passing through the holes 42a has been separated by the separation unit 40. For example, a crusher or a grinder can be used as the shredding unit 50. A screen is provided in the shredding unit 50. The hole diameter of the screen may be between 30 mm and 70 mm inclusive, for example.

Figure 6:
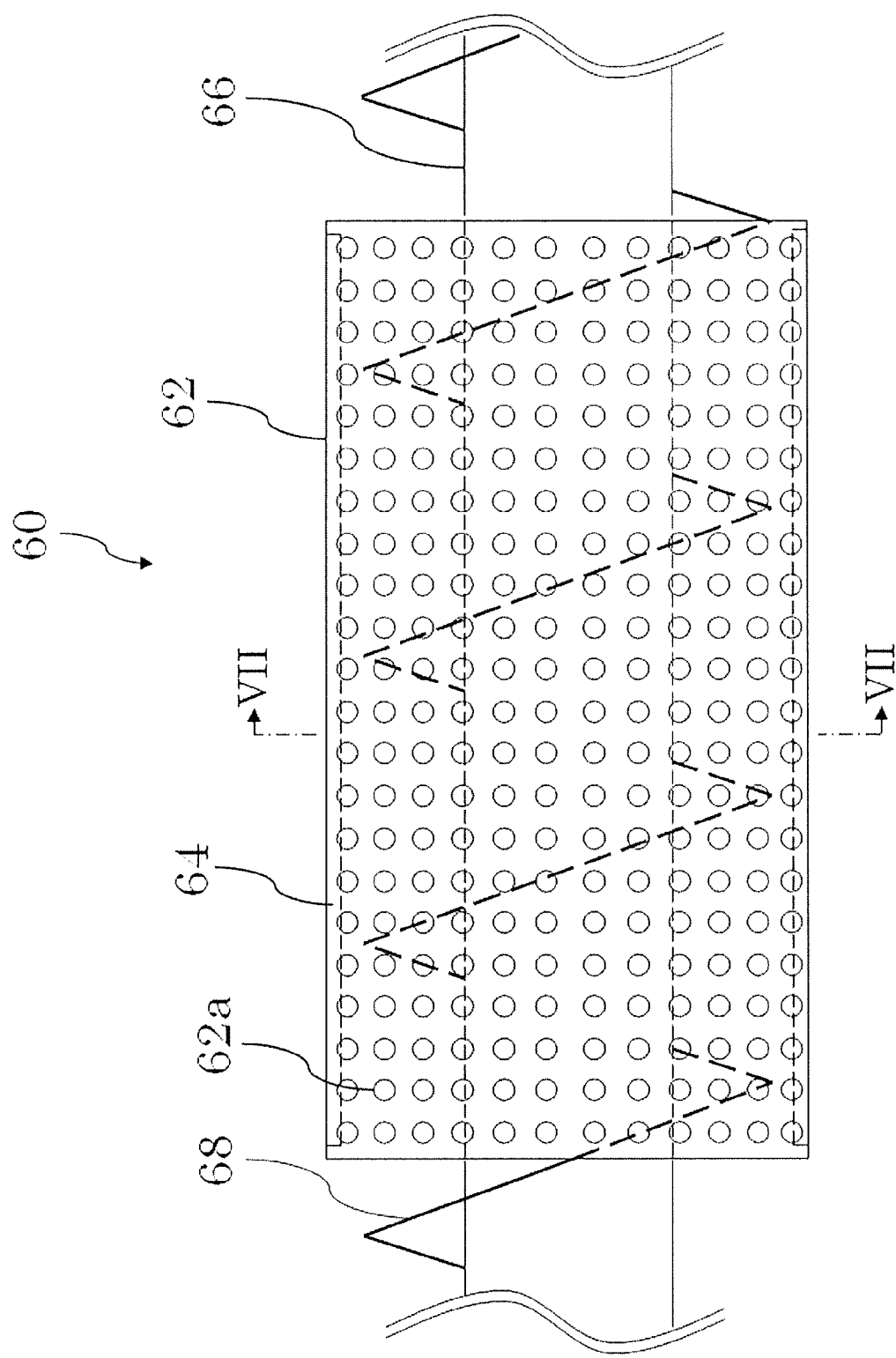
FIG. 6 is a side view showing a separation unit 60 of the separation device in FIG. 1.
Figure 7:
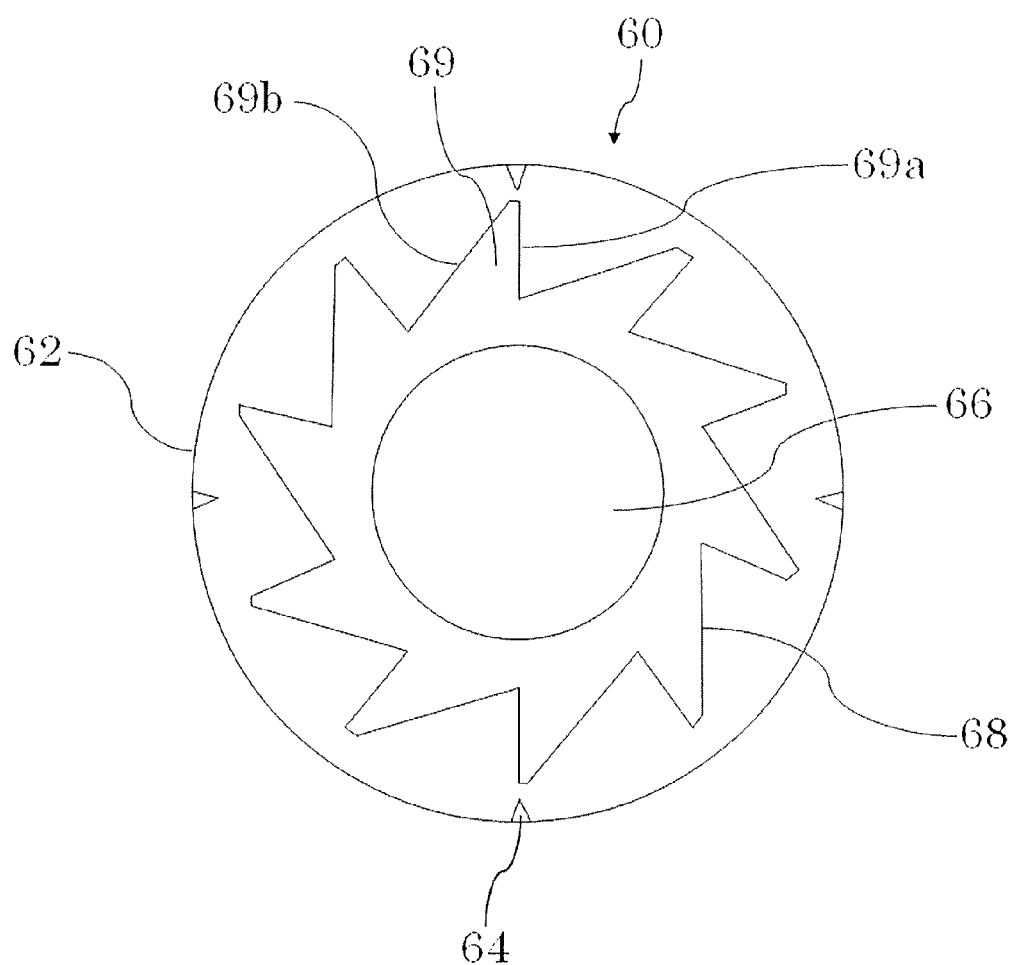
FIG. 7 is a cross-sectional view taken along line VII-VII in FIG. 6.

The structure of the separation unit 60 will be described with reference to FIGS. 6 and 7. FIG. 6 is a side view showing the separation unit 60. FIG. 7 is a cross-sectional view taken along line VII-VII in FIG. 6. The separation unit 60 has a drum 62 (third tubular portion). The drum 62 has a substantially cylindrical tubular shape and is provided so as to be rotatable about its central axis. The central axis of the drum 62 extends horizontally. The inner diameter of the drum 62 may be between 30 cm and 50 cm inclusive, for example.

A large number of holes 62a (third holes) are formed in the drum 62. The holes 62a are formed over substantially the entire drum 62. The holes 62a do not allow the plastic contained in the disposable diaper fragments shredded by the shredding unit 50 to pass through, but allow the water-absorbent polymer to pass through. The area of each of the holes 62a in a plan view is smaller than the area of each of the holes 42a in a plan view. The diameter of the holes 62a may be between 3 mm and 7 mm inclusive, for example. The separation unit 60 rotates the drum 62 in a state in which the disposable diaper fragments shredded by the shredding unit 50 are accommodated therein, thereby separating the water-absorbent polymer passing through the holes 62a from the disposable diaper fragments.

A ridge 64 (third ridge) is formed on an inner circumferential surface of the drum 62. The ridge 64 extends in a direction in which the central axis of the drum 62 extends. The ridge 64 extends over substantially the entire path from an inlet side (left side of FIG. 6) to an outlet side (right side of FIG. 6) of the drum 62. Also, the ridge 64 has a substantially triangular cross-sectional shape. The height (length in the radial direction of the drum 62) of the ridge 64 may be between 5 mm and 2 cm inclusive, for example. Preferably, "r" (r: an integer between 3 and 5 inclusive) ridges 64 are provided. The "r" ridges 64 are arranged on the inner circumferential surface of the drum 62 at regular intervals. That is to say, in a cross section (cross section shown in FIG. 7) that is perpendicular to the central axis of the drum 62, an angle γ that is formed by a line connecting one ridge 64 to the central axis and a line connecting the next ridge 64 to the central axis is substantially equal to 360°/r. In the present embodiment, r=4 and γ=90°.

A rotating rod 66 and a screw member 68 are provided inside the drum 62. The rotating rod 66 has a substantially cylindrical shape and is provided so as to be rotatable about its central axis. The central axis of the rotating rod 66 coincides with the central axis of the drum 62. However, the rotating rod 66 rotates independently of the drum 62. The outer diameter of the rotating rod 66 may be between 15 cm and 25 cm inclusive, for example.

The screw member 68 is helically provided around the rotating rod 66. The screw member 68 is fixed to the rotating rod 66 and rotates together with the rotating rod 66. A plurality of teeth 69 are formed in the screw member 68. An end portion of each tooth 69 is constituted by a side 69a and a side 69b in a front view (see FIG. 7).

The side 69a extends in the radial direction of the drum 62 and the rotating rod 66. An inner end (end that is closer to the rotating rod 66) of the side 69a is located at a position spaced apart from the rotating rod 66. Similarly, an outer end (end that is closer to the drum 62) of the side 69a is located at a position spaced apart from the drum 62. The distance from the outer end of the side 69a to the inner circumferential surface of the drum 62 is larger than the height of the ridge 64 and may be between 1 cm and 3 cm inclusive, for example. The side 69b connects the outer end of the side 69a to the inner end of the side 69a of the next tooth 69. The side 69b is longer than the side 69a. The ratio of the length of the side 69b to the length of the side 69a may be between 2 and 2.5 inclusive, for example.

The rotating rod 66 and the screw member 68 rotate in a left-handed direction (counterclockwise) in FIG. 7. That is to say, in each tooth 69, the side 69b is located on the forward side with respect to the rotation direction, and the side 69a is located on the rearward side with respect to the rotation direction. The rotation direction of the drum 62 described above may be the same as the rotation direction of the rotating rod 66 and the screw member 68 or may be opposite to this rotation direction. In the case where these rotation directions are the same, it is preferable that the rotation speed of the rotating rod 66 and the screw member 68 is greater than the rotation speed of the drum 62.

The separation device 1 is further provided with a transfer path 72, a transfer path 74, a transfer path 76, a transfer path 78, and a transfer path 80. The transfer path 72 transfers the disposable diaper fragments after shredding by the shredding unit 10 to the separation unit 20. The transfer path 72 may be a screw conveyor, for example. The transfer path 74 transfers the disposable diaper fragments after separation by the separation unit 20 to the shredding unit 30. The transfer path 74 may be a duct, for example.

The transfer path 76 is a duct (first air pipe) and transfers the disposable diaper fragments after shredding by the shredding unit 30 to the separation unit 40 with air pressure. The transfer path 78 is a duct (second air pipe) and transfers the disposable diaper fragments after separation by the separation unit 40 to the shredding unit 50 with air pressure. The transfer path 80 is a duct (third air pipe) and transfers the disposable diaper fragments after shredding by the shredding unit 50 to the separation unit 60.

Figure 8:
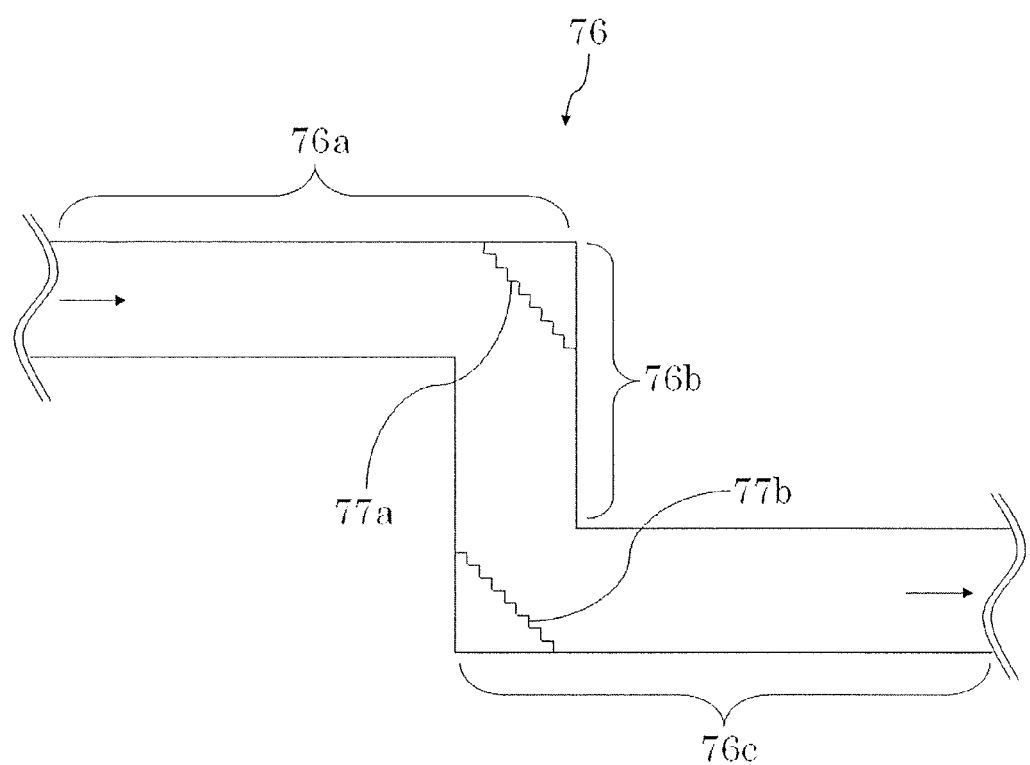
FIG. 8 is a cross-sectional view showing a transfer path 76 of the separation device in FIG. 1.

The structure of the transfer path 76 will be described with reference to FIG. 8. FIG. 8 is a cross-sectional view showing the transfer path 76. The transfer path 76 has a portion 76a (first portion) extending in a first direction, a portion 76b (second portion) extending in a second direction, and a portion 76c (third portion) extending in a third direction. In the present embodiment, the first direction is a horizontal direction, the second direction is a vertical direction, and the third direction is a horizontal direction. The portion 76b is connected to the portion 76a on a downstream side of the portion 76a. The portion 76c is connected to the portion 76b on the downstream side of the portion 76b. Thus, the portion 76a, the portion 76b, and the portion 76c constitute a single cranked duct. The inner diameter of the transfer path 76 may be between 10 cm and 20 cm inclusive, for example.

An uneven surface 77a (first uneven surface) is present in a connecting portion between the portion 76a and the portion 76b. The uneven surface 77a is provided at a position where the disposable diaper fragments that are transferred through the portion 76a collide with this uneven surface. The uneven surface 77a is at an angle of about 45° to a vertical plane. For example, a corrugated or embossed plate-like member can be used as the uneven surface 77a. The material for the uneven surface 77a may be aluminum, for example.

An uneven surface 77b (second uneven surface) is present in a connecting portion between the portion 76b and the portion 76c. The uneven surface 77b is provided at a position where the disposable diaper fragments that are transferred through the portion 76b collide with this uneven surface. The uneven surface 77b is at an angle of about 45° to a horizontal plane. For example, a corrugated or embossed plate-like member can be used as the uneven surface 77b. The material for the uneven surface 77b may be aluminum, for example.

Figure 9:
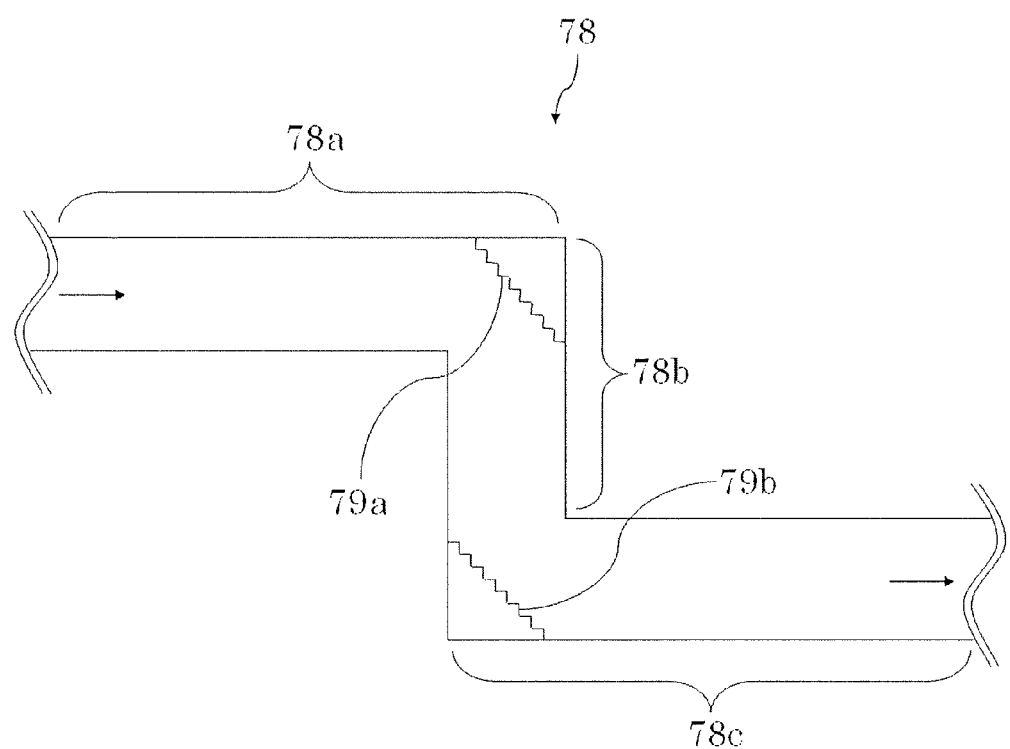
FIG. 9 is a cross-sectional view showing a transfer path 78 of the separation device in FIG. 1.

The structure of the transfer path 78 will be described with reference to FIG. 9. FIG. 9 is a cross-sectional view showing the transfer path 78. The transfer path 78 has a portion 78a (first portion) extending in a first direction, a portion 78b (second portion) extending in a second direction, and a portion 78c (third portion) extending in a third direction. In the present embodiment, the first direction is a horizontal direction, the second direction is a vertical direction, and the third direction is a horizontal direction. The portion 78b is connected to the portion 78a on the downstream side of the portion 78a. The portion 78c is connected to the portion 78b on the downstream side of the portion 78b. Thus, the portion 78a, the portion 78b, and the portion 78c constitute a single cranked duct. The inner diameter of the transfer path 78 may be between 10 cm and 20 cm inclusive, for example.

An uneven surface 79a (third uneven surface) is present in a connecting portion between the portion 78a and the portion 78b. The uneven surface 79a is provided at a position where the disposable diaper fragments that are transferred through the portion 78a collide with this uneven surface. The uneven surface 79a is at an angle of about 45° to a vertical plane. For example, a corrugated or embossed plate-like member can be used as the uneven surface 79a. The material for the uneven surface 79a may be aluminum, for example.

An uneven surface 79b (fourth uneven surface) is present in a connecting portion between the portion 78b and the portion 78c. The uneven surface 79b is provided at a position where the disposable diaper fragments that are transferred through the portion 78b collide with this uneven surface. The uneven surface 79b is at an angle of about 45° to a horizontal plane. For example, a corrugated or embossed plate-like member can be used as the uneven surface 79b. The material for the uneven surface 79b may be aluminum, for example.

Figure 10:
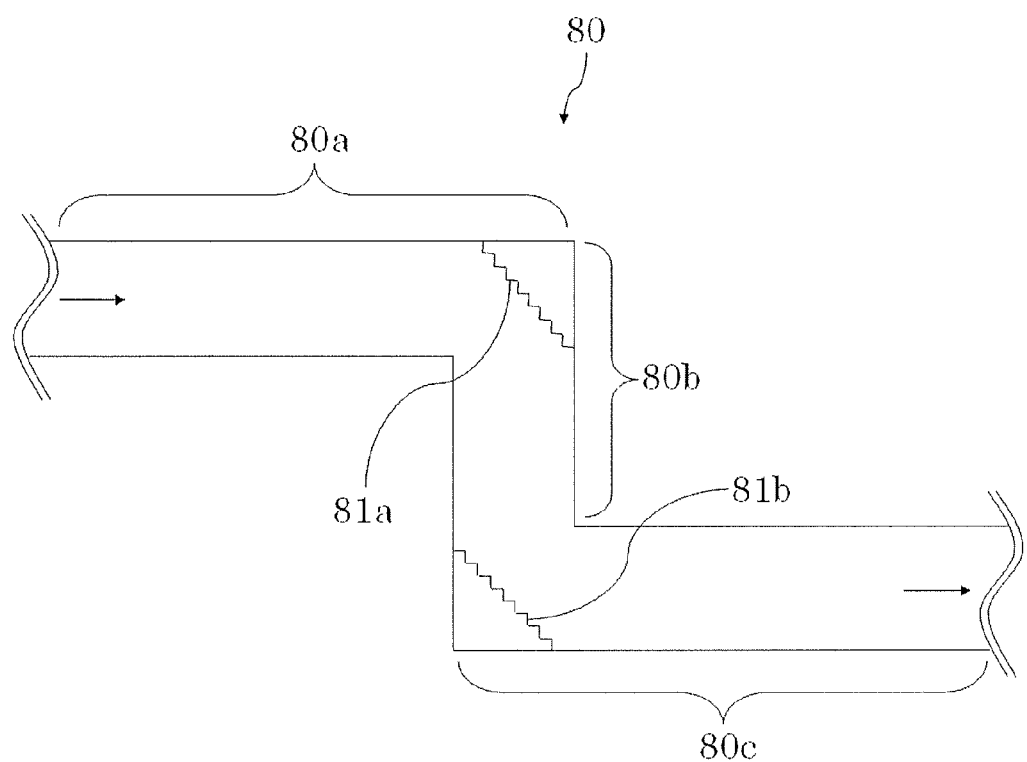
FIG. 10 is a cross-sectional view showing a transfer path 80 of the separation device in FIG. 1.

The structure of the transfer path 80 will be described with reference to FIG. 10. FIG. 10 is a cross-sectional view showing the transfer path 80. The transfer path 80 has a portion 80a (first portion) extending in a first direction, a portion 80b (second portion) extending in a second direction, and a portion 80c (third portion) extending in a third direction. In the present embodiment, the first direction is a horizontal direction, the second direction is a vertical direction, and the third direction is a horizontal direction. The portion 80b is connected to the portion 80a on the downstream side of the portion 80a. The portion 80c is connected to the portion 80b on the downstream side of the portion 80b. Thus, the portion 80a, the portion 80b, and the portion 80c constitute a single cranked duct. The inner diameter of the transfer path 80 may be between 10 cm and 20 cm inclusive, for example.

An uneven surface 81a (fifth uneven surface) is present in a connecting portion between the portion 80a and the portion 80b. The uneven surface 81a is provided at a position where the disposable diaper fragments that are transferred through the portion 80a collide with this uneven surface. The uneven surface 81a is at an angle of about 45° to a vertical plane. For example, a corrugated or embossed plate-like member can be used as the uneven surface 81a. The material for the uneven surface 81a may be aluminum, for example.

An uneven surface 81b (sixth uneven surface) is present in a connecting portion between the portion 80b and the portion 80c. The uneven surface 81b is provided at a position where the disposable diaper fragments that are transferred through the portion 80b collide with this uneven surface. The uneven surface 81b is at an angle of about 45° to a horizontal plane. For example, a corrugated or embossed plate-like member can be used as the uneven surface 81b. The material for the uneven surface 81b may be aluminum, for example.

The operation of the separation device 1 will be described. A disposable diaper, which is a processing target, is first shredded by the shredding unit 10 into fragments. The disposable diaper fragments shredded by the shredding unit 10 are transferred to the separation unit 20 through the transfer path 72. The disposable diaper fragments transferred to the separation unit 20 are propelled from the inlet side (left side of FIG. 2) to the outlet side (right side of FIG. 2) of the drum 22 by the rotating screw member 28. Meanwhile, due to the centrifugal force and the like generated by the rotation of the drum 22, the water-absorbent polymer dissociated from the plastic is discharged to the outside of the drum 22 through the holes 22a. Thus, a portion of the water-absorbent polymer is separated from the disposable diaper fragments. It should be noted that in the case where the processing target is a disposable diaper as in the present embodiment, paper (fluff pulp etc.) is also separated together with the water-absorbent polymer.

The disposable diaper fragments after separation by the separation unit 20 are transferred to the shredding unit 30 through the transfer path 74 and are further shredded. The disposable diaper fragments shredded by the shredding unit 30 are transferred to the separation unit 40 through the transfer path 76. The disposable diaper fragments transferred to the separation unit 40 are propelled from the inlet side (left side of FIG. 4) to the outlet side (right side of FIG. 4) of the drum 42 by the rotating screw member 48. Meanwhile, due to the centrifugal force and the like generated by the rotation of the drum 42, the water-absorbent polymer dissociated from the plastic is discharged to the outside of the drum 42 through the holes 42a. Thus, the remaining water-absorbent polymer is separated from the disposable diaper fragments.

The disposable diaper fragments after separation by the separation unit 40 are transferred to the shredding unit 50 through the transfer path 78 and are further shredded. The disposable diaper fragments shredded by the shredding unit 50 are transferred to the separation unit 60 through the transfer path 80. The disposable diaper fragments transferred to the separation unit 60 are propelled from the inlet side (left side of FIG. 6) to the outlet side (right side of FIG. 6) of the drum 62 by the rotating screw member 68. Meanwhile, due to the centrifugal force and the like generated by the rotation of the drum 62, the water-absorbent polymer dissociated from the plastic is discharged to the outside of the drum 62 through the holes 62a. Thus, the remaining water-absorbent polymer is separated from the disposable diaper fragments.

The effects of the present embodiment will be described. In the present embodiment, the transfer path 76 has the portion 76a and the portion 76b that are orthogonal to each other (see FIG. 8). Thus, the disposable diaper fragments transferred by air pressure collide with the inner surface of the transfer path 76 in the connecting portion between the portion 76a and the portion 76b. The impact of this collision promotes dissociation of the water-absorbent polymer from the plastic. This contributes to an improvement in the separation efficiency of the separation device 1. Therefore, according to the present embodiment, the separation device 1 having the high separation efficiency is realized.

The plastic that is recovered according to the present embodiment may be formed into pellets by granulation. The plastic pellets can be reused in various plastic products. In the case where the plastic is reused, if the plastic contains a large amount of water-absorbent polymer, the water-absorbent polymer may, for example, swell when the plastic product is wetted, and cause a deterioration in quality of the product. In this regard, reusing the plastic that is recovered according to the present embodiment enables a high-quality plastic product to be produced. Preferably, the weight ratio of the water-absorbent polymer adhering to the plastic immediately after the processing of the present embodiment with respect to that plastic is 5% or less. This weight ratio is more preferably 3% or less, and even more preferably 1% or less.

Furthermore, the uneven surface 77a is present in the connecting portion between the portion 76a and the portion 76b. When colliding with the uneven surface 77a, the disposable diaper fragments are subjected to a stronger impact than in the case where they collide with a flat surface. Therefore, dissociation of the water-absorbent polymer from the plastic is promoted even more.

The transfer path 76 has the portion 76c that is orthogonal to the portion 76b. Thus, the disposable diaper fragments transferred by air pressure also collide with the inner surface of the transfer path 76 in the connecting portion between the portion 76b and the portion 76c. The impact of this collision promotes dissociation of the water-absorbent polymer from the plastic.

Furthermore, the uneven surface 77b is present in the connecting portion between the portion 76b and the portion 76c. When colliding with the uneven surface 77b, the disposable diaper fragments are subjected to a stronger impact than in the case where they collide with a flat surface. Therefore, dissociation of the water-absorbent polymer from the plastic is promoted even more.

The transfer path 78 has the portion 78a and the portion 78b that are orthogonal to each other (see FIG. 9). Thus, the disposable diaper fragments transferred by air pressure collide with the inner surface of the transfer path 78 in the connecting portion between the portion 78a and the portion 78b. The impact of this collision promotes dissociation of the water-absorbent polymer from the plastic.

Furthermore, the uneven surface 79a is present in the connecting portion between the portion 78a and the portion 78b. When colliding with the uneven surface 79a, the disposable diaper fragments are subjected to a stronger impact than in the case where they collide with a flat surface. Therefore, dissociation of the water-absorbent polymer from the plastic is promoted even more.

The transfer path 78 has the portion 78c that is orthogonal to the portion 78b. Thus, the disposable diaper fragments transferred by air pressure also collide with the inner surface of the transfer path 78 in the connecting portion between the portion 78b and the portion 78c. The impact of this collision promotes dissociation of the water-absorbent polymer from the plastic.

Furthermore, the uneven surface 79b is present in the connecting portion between the portion 78b and the portion 78c. When colliding with the uneven surface 79b, the disposable diaper fragments are subjected to a stronger impact than in the case where they collide with a flat surface. Therefore, dissociation of the water-absorbent polymer from the plastic is promoted even more.

The transfer path 80 has the portion 80a and the portion 80b that are orthogonal to each other (see FIG. 10). Thus, the disposable diaper fragments transferred by air pressure collide with the inner surface of the transfer path 80 in the connecting portion between the portion 80a and the portion 80b. The impact of this collision promotes dissociation of the water-absorbent polymer from the plastic.

Furthermore, the uneven surface 81a is present in the connecting portion between the portion 80a and the portion 80b. When colliding with the uneven surface 81a, the disposable diaper fragments are subjected to a stronger impact than in the case where they collide with a flat surface. Therefore, dissociation of the water-absorbent polymer from the plastic is promoted even more.

The transfer path 80 has the portion 80c that is orthogonal to the portion 80b. Thus, the disposable diaper fragments transferred by air pressure also collide with the inner surface of the transfer path 80 in the connecting portion between the portion 80b and the portion 80c. The impact of this collision promotes dissociation of the water-absorbent polymer from the plastic.

Furthermore, the uneven surface 81b is present in the connecting portion between the portion 80b and the portion 80c. When colliding with the uneven surface 81b, the disposable diaper fragments are subjected to a stronger impact than in the case where they collide with a flat surface. Therefore, dissociation of the water-absorbent polymer from the plastic is promoted even more.

In the present embodiment, after shredding by the shredding unit 10 and separation by the separation unit 20, shredding by the shredding unit 30 and separation by the separation unit 40 are performed. Therefore, the separation efficiency is improved when compared with the case where shredding and separation are performed only one time.

Incidentally, Patent Document 1 discloses a separation device in which two separators are provided. However, the separation device in this document is significantly different from the separation device 1 in that the processing target processed by the first separator is transferred to the second separator without being shredded.

In the separation device 1, the disposable diaper fragments after separation by the separation unit 20 are shredded by the shredding unit 30 before being transferred to the separation unit 40. Therefore, separation by the separation unit 40 is promoted when compared with the case where shredding by the shredding unit 30 is not performed. This leads to an improvement in the separation efficiency of the separation device 1.

Furthermore, in the present embodiment, after shredding by the shredding unit 30 and separation by the separation unit 40 are performed, shredding by the shredding unit 50 and separation by the separation unit 60 are performed. The separation efficiency is improved even more by performing shredding and separation three times in this manner.

The drum 22 is provided with the ridges 24. If the ridges 24 are not provided, the disposable diaper fragments tend to collect in a lower portion of the drum 22 due to the effect of gravity. In contrast, in the present embodiment, the disposable diaper fragments in the drum 22 are scooped up by the ridges 24 and thus easily reach an upper portion of the drum 22. Therefore, the disposable diaper fragments are distributed over a wide range of the inner circumferential surface of the drum 22, so that separation by the separation unit 20 is promoted. Moreover, dissociation of the water-absorbent polymer from the plastic is promoted by the impact of the disposable diaper fragments when falling down from the upper portion of the drum 22. Furthermore, the ridges 24 become obstacles when the disposable diaper fragments are propelled by the screw member 28, and thus the time for which the disposable diaper fragments stay in the drum 22 is prolonged. Thus, a larger amount of water-absorbent polymer can be separated from the disposable diaper fragments.

The screw member 28 is provided inside the drum 22. The disposable diaper fragments in the drum 22 are beaten and rubbed against the inner circumferential surface of the drum 22 by the screw member 28. The impact and the frictional force at that time promote dissociation of the water-absorbent polymer from the plastic. Moreover, since the ridges 24 are provided, the disposable diaper fragments may be beaten and rubbed against the inner circumferential surface of the drum 22 by the screw member 28 in a state in which the disposable diaper fragments are caught on the ridges 24. In that case, forces are focused, so that the impact and the frictional force that are applied to the disposable diaper fragments increase, and accordingly dissociation of the water-absorbent polymer from the plastic is promoted even more.

The screw member 28 rotates with the side 29b that forms an obtuse angle with the rotation direction (direction of the tangent to the rotating rod 26), rather than the side 29a that forms an approximately right angle with the rotation direction, being located on the forward side (see FIG. 3). Thus, the disposable diaper fragments can be prevented from being excessively caught on the teeth 29 of the screw member 28.

The drum 42 is provided with the ridges 44. If the ridges 44 are not provided, the disposable diaper fragments tend to collect in a lower portion of the drum 42 due to the effect of gravity. In contrast, in the present embodiment, the disposable diaper fragments in the drum 42 are scooped up by the ridges 44 and thus easily reach an upper portion of the drum 42. Therefore, the disposable diaper fragments are distributed over a wide range of the inner circumferential surface of the drum 42, so that separation by the separation unit 40 is promoted. Moreover, dissociation of the water-absorbent polymer from the plastic is promoted by the impact of the disposable diaper fragments when falling down from the upper portion of the drum 42. Furthermore, the ridges 44 become obstacles when the disposable diaper fragments are propelled by the screw member 48, and thus the time for which the disposable diaper fragments stay in the drum 42 is prolonged. Thus, a larger amount of water-absorbent polymer can be separated from the disposable diaper fragments.

The screw member 48 is provided inside the drum 42. The disposable diaper fragments in the drum 42 are beaten and rubbed against the inner circumferential surface of the drum 42 by the screw member 48. The impact and the frictional force at that time promote dissociation of the water-absorbent polymer from the plastic. Moreover, since the ridges 44 are provided, the disposable diaper fragments may be beaten and rubbed against the inner circumferential surface of the drum 42 by the screw member 48 in a state in which the disposable diaper fragments are caught on the ridges 44. In that case, forces are focused, so that the impact and the frictional force that are applied to the disposable diaper fragments increase, and accordingly dissociation of the water-absorbent polymer from the plastic is promoted even more.

The screw member 48 rotates with the side 49b that forms an obtuse angle with the rotation direction (direction of the tangent to the rotating rod 46), rather than the side 49a that forms an approximately right angle with the rotation direction, being located on the forward side (see FIG. 5). Thus, the disposable diaper fragments can be prevented from being excessively caught on the teeth 49 of the screw member 48.

The drum 62 is provided with the ridges 64. If the ridges 64 are not provided, the disposable diaper fragments tend to collect in a lower portion of the drum 62 due to the effect of gravity. In contrast, in the present embodiment, the disposable diaper fragments in the drum 62 are scooped up by the ridges 64 and thus easily reach an upper portion of the drum 62. Thus, the disposable diaper fragments are distributed over a wide range of the inner circumferential surface of the drum 62, so the separation by the separation unit 60 is promoted. Moreover, due to the impact of the disposable diaper fragments when falling down from the upper portion of the drum 62, dissociation of the water-absorbent polymer from the plastic is promoted. Furthermore, the ridges 64 become obstacles when the disposable diaper fragments are propelled by the screw member 68, and thus the time for which the disposable diaper fragments stay in the drum 62 is prolonged. Accordingly, a larger amount of water-absorbent polymer can be separated from the disposable diaper fragments.

The screw member 68 is provided inside the drum 62. The disposable diaper fragments in the drum 62 are beaten and rubbed against the inner circumferential surface of the drum 62 by the screw member 68. The impact and the frictional force at that time promote dissociation of the water-absorbent polymer from the plastic. Moreover, since the ridges 64 are provided, the disposable diaper fragments may be beaten and rubbed against the inner circumferential surface of the drum 62 by the screw member 68 in a state in which the disposable diaper fragments are caught on the ridges 64. In that case, forces are focused, so that the impact and the frictional force that are applied to the disposable diaper fragments increase, and accordingly dissociation of the water-absorbent polymer from the plastic is promoted even more.

The screw member 68 rotates with the side 69b that forms an obtuse angle with the rotation direction (direction of the tangent to the rotating rod 66), rather than the side 69a that forms an approximately right angle with the rotation direction, being located on the forward side (see FIG. 7). Thus, the disposable diaper fragments can be prevented from being excessively caught on the teeth 69 of the screw member 68.

The separation device according to the present invention is not limited to the foregoing embodiment, and various modifications can be made thereto. For example, in the foregoing embodiments, an example in which shredding and separation are performed three times has been described. However, it is possible that shredding and separation are performed two times. In this case, the shredding unit 50, the separation unit 60, the transfer path 78, and the transfer path 80 in FIG. 1 are not necessary. Also, it is possible that shredding and separation are performed one time. In this case, the shredding unit 10, the separation unit 20, the transfer path 72, the transfer path 74, the shredding unit 50, the separation unit 60, the transfer path 78, and the transfer path 80 in FIG. 1 are not necessary.

In the foregoing embodiments, an example in which the drum 22 has a cylindrical tubular shape has been described. However, it is also possible that the drum 22 has a tapered shape. The same applies to the drum 42 and the drum 62.

In the foregoing embodiments, an example in which the central axis of the drum 22 extends horizontally has been described. However, it is also possible that the central axis of the drum 22 is sloped downward from the inlet side toward the outlet side. The same applies to the drum 42 and the drum 62.

In the foregoing embodiments, an example in which the holes 22a are formed over substantially the entire drum 22 has been described. However, it is also possible that the holes 22a are formed in only a portion of the drum 22. Moreover, it is also possible that the holes 22a are formed by forming substantially the whole or a portion of the drum 22 in a mesh form. That is to say, in this case, the meshes of the drum 22 correspond to the holes 22a. The same applies to the holes 42a and the holes 62a.

In the foregoing embodiments, an example in which the ridges 24 extend over the entire path from the inlet side to the outlet side of the drum 22 has been described. However, it is also possible that the ridges 24 extend in only a portion of the path from the inlet side to the outlet side of the drum 22. The same applies to the ridges 44 and the ridges 64.

Figure 11:
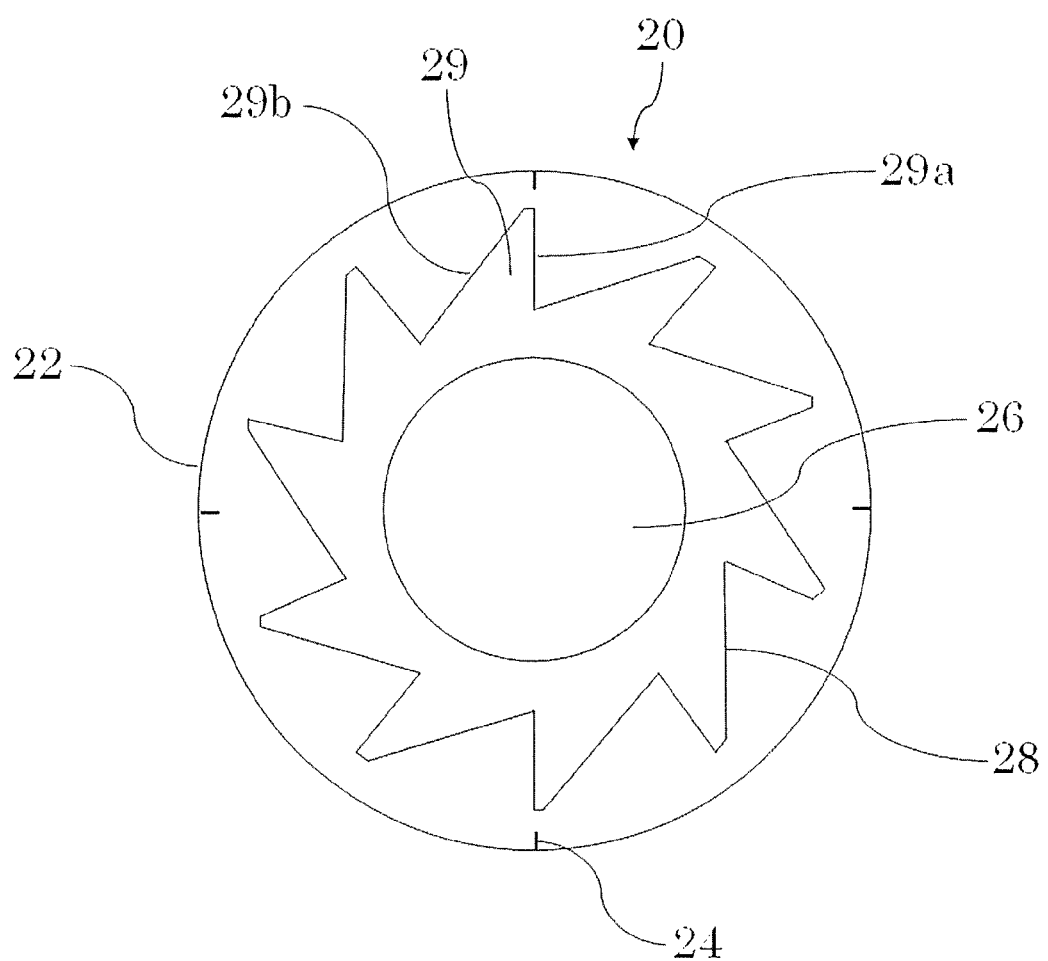
FIG. 11 is a cross-sectional view for explaining a modification of a ridge 24 shown in FIG. 3.

In the foregoing embodiments, the ridges 24 having a substantially triangular cross-sectional shape have been described as an example. However, it is also possible that the ridges 24 have a flat plate-like shape as shown in FIG. 11. The same applies to the ridges 44 and the ridges 64.

In the foregoing embodiments, an example in which four ridges 24 are provided on the inner circumferential surface of the drum 22 has been described. However, the number of ridges 24 can be set at any number greater than or equal to 1. The same applies to the ridges 44 and the ridges 64.

In the foregoing embodiments, an example in which the ridges 24 are provided on the inner circumferential surface of the drum 22 has been described. However, the provision of the ridges 24 is not necessarily required. The same applies to the ridges 44 and the ridges 64.

In the foregoing embodiments, an example in which the rotating rod 26 and the screw member 28 are provided inside the drum 22 has been described. However, the provision of the rotating rod 26 and the screw member 28 is not necessarily required. The same applies to the rotating rod 46 and the screw member 48 and to the rotating rod 66 and the screw member 68.

Figure 12:
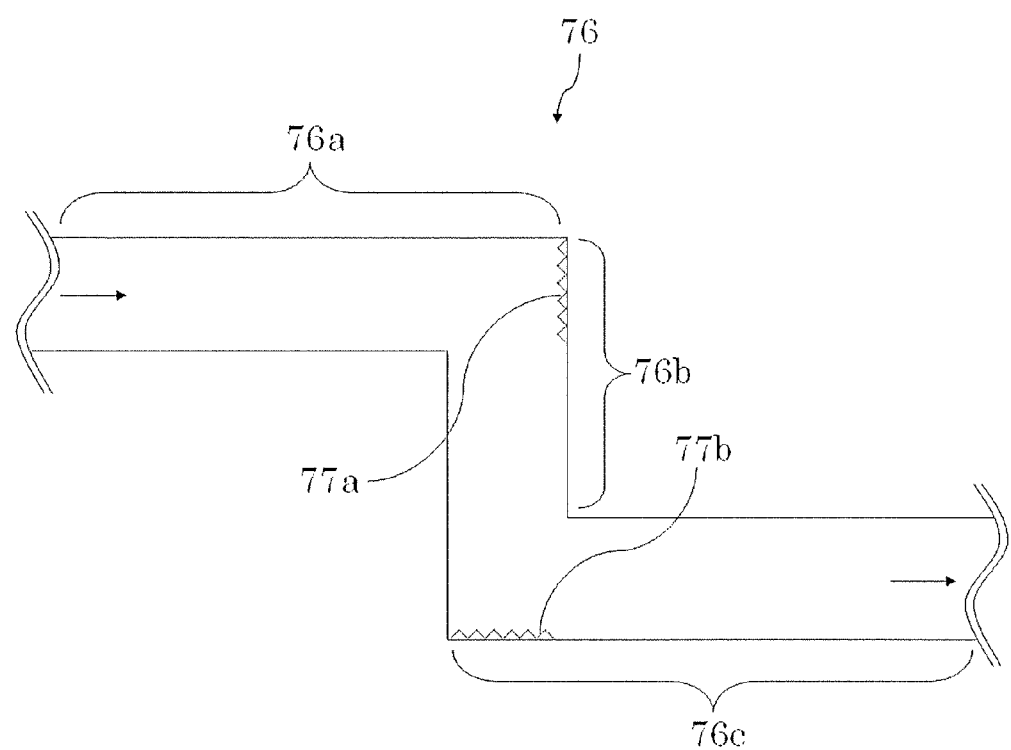
FIG. 12 is a cross-sectional view for explaining a modification of an uneven surface 77a and an uneven surface 77b shown in FIG. 8.
Figure 13:
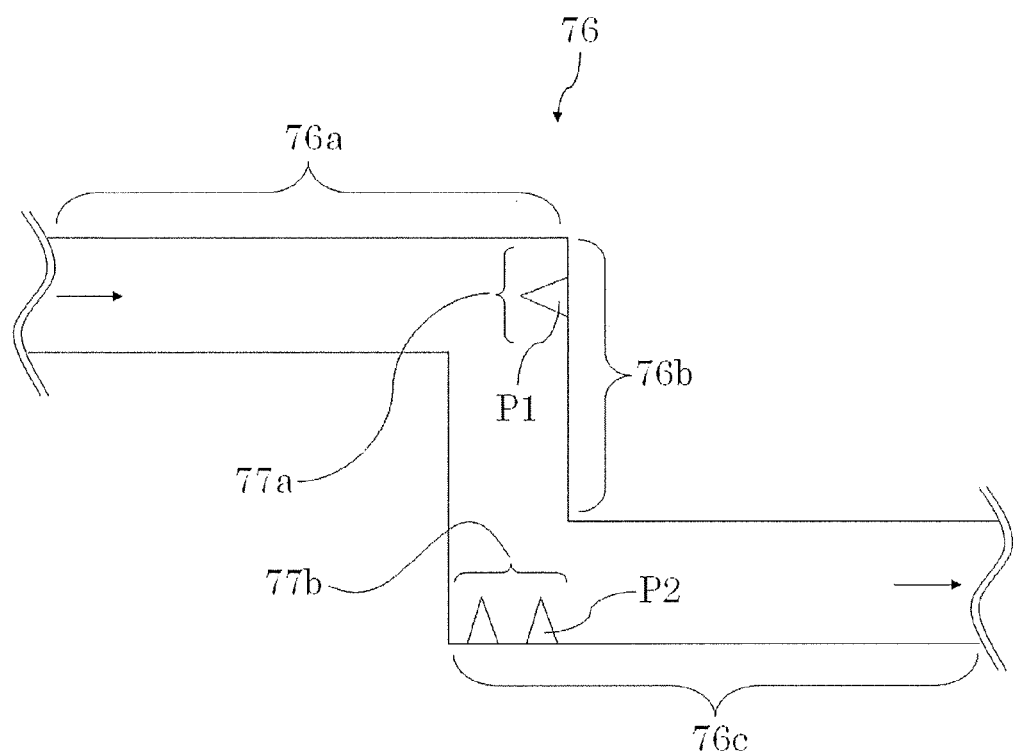
FIG. 13 is a cross-sectional view for explaining a modification of the uneven surface 77a and the uneven surface 77b shown in FIG. 8.

In the foregoing embodiments, an example in which the uneven surface 77a is at a certain angle to a vertical plane has been described. However, it is also possible that the uneven surface 77a extends along a vertical plane as shown in FIG. 12. Moreover, it is also possible that the uneven surface 77a is realized by providing a protrusion P1 on the inner surface (position with which the disposable diaper fragments transferred through the portion 76a collide) of the transfer path 76 as shown in FIG. 13. The number of protrusions P1 may be one or may be two or more. The same applies to the uneven surface 79a and the uneven surface 81a.

In the foregoing embodiments, an example in which the uneven surface 77b is at a certain angle to a horizontal plane has been described. However, it is also possible that the uneven surface 77b extends along a horizontal plane as shown in FIG. 12. Moreover, it is also possible that the uneven surface 77b is realized by providing a protrusion P2 on the inner surface (position with which the disposable diaper fragments transferred through the portion 76b collide) of the transfer path 76 as shown in FIG. 13. The number of protrusions P2 may be one or may be two or more. The same applies to the uneven surface 79b and the uneven surface 81b.

In the foregoing embodiments, an example in which the uneven surface 77a is provided has been described. However, the provision of the uneven surface 77a is not necessarily required. The same applies to the uneven surface 79a and the uneven surface 81a.

In the foregoing embodiments, an example in which the uneven surface 77b is provided has been described. However, the provision of the uneven surface 77b is not necessarily required. The same applies to the uneven surface 79b and the uneven surface 81b.

LIST OF REFERENCE NUMERALS

1 Separation device
10 Shredding unit (second shredding unit)
20 Separation unit (second separation unit)
22 Drum (second tubular portion)
22a Hole (second hole)
24 Ridge (second ridge)
26 Rotating rod
28 Screw member
29 Tooth
30 Shredding unit (first shredding unit)
40 Separation unit (first separation unit)
42 Drum (first tubular portion)
42a Hole (first hole)
44 Ridge (first ridge)
46 Rotating rod
48 Screw member
49 Tooth
50 Shredding unit (third shredding unit)
60 Separation unit (third separation unit)
62 Drum (third tubular portion)
62a Hole (third hole)
64 Ridge (third ridge)
66 Rotating rod
68 Screw member
69 Tooth
72 Transfer path
74 Transfer path
76 Transfer path (first air pipe)
77a Uneven surface (first uneven surface)
77b Uneven surface (second uneven surface)
78 Transfer path (second air pipe)
79a Uneven surface (third uneven surface)
79b Uneven surface (fourth uneven surface)
80 Transfer path (third air pipe)
81a Uneven surface (fifth uneven surface)
81b Uneven surface (sixth uneven surface)

The invention claimed is:

1. A separation device comprising:
a first shredding unit that shreds a processing target containing a first material and a second material adhering to the first material;
a first separation unit that has a first tubular portion in which a large number of first holes that allow the second material contained in the processing target shredded by the first shredding unit to pass through without allowing the first material to pass through are formed, and that separates the second material passing through the first holes from the processing target by rotating the first tubular portion in a state in which the processing target shredded by the first shredding unit is accommodated in the first tubular portion; and
a first air pipe for transferring the processing target shredded by the first shredding unit to the first separation unit with air pressure,
wherein the first air pipe has a first portion that extends in a first direction and a second portion that is connected to the first portion on a downstream side of the first portion and that extends in a second direction substantially orthogonal to the first direction.

2. The separation device according to claim 1, comprising a first uneven surface that is present in a connecting portion between the first portion and the second portion of the first air pipe and with which the processing target transferred through the first portion collides.

3. The separation device according to claim 1, wherein the first air pipe has a third portion that is connected to the second portion on a downstream side of the second portion and that extends in a third direction substantially orthogonal to the second direction.

4. The separation device according to claim 3, comprising a second uneven surface that is present in a connecting portion between the second portion and the third portion of the first air pipe and with which the processing target transferred through the second portion collides.

5. The separation device according to claim 1, comprising a first ridge that is provided on an inner circumferential surface of the first tubular portion and that extends in a direction in which a central axis of the first tubular portion extends.

6. The separation device according to claim 5, wherein "p" of said first ridges are present, "p" being an integer between 3 and 5 inclusive, and the "p" first ridges are arranged on the inner circumferential surface of the first tubular portion at regular intervals.

7. The separation device according to claim 1, comprising:
a second shredding unit that shreds the processing target; and
a second separation unit that has a second tubular portion in which a large number of second holes that allow the second material contained in the processing target shredded by the second shredding unit to pass through without allowing the first material to pass through are formed, and that separates the second material passing through the second holes from the processing target by rotating the second tubular portion in a state in which the processing target shredded by the second shredding unit is accommodated in the second tubular portion,
wherein the first shredding unit shreds the processing target from which the second material passing through the second holes is separated by the second separation unit.

8. The separation device according to claim 7, wherein an area of each of the first holes in a plan view is smaller than an area of each of the second holes in a plan view.

9. The separation device according to claim 1, comprising:
a third shredding unit that shreds the processing target from which the second material passing through the first holes is separated by the first separation unit; and
a third separation unit that has a third tubular portion in which a large number of third holes that allow the second material contained in the processing target shredded by the third shredding unit to pass through without allowing the first material to pass through are formed, and that separates the second material passing through the third holes from the processing target by rotating the third tubular portion in a state in which the processing target shredded by the third shredding unit is accommodated in the third tubular portion.

10. The separation device according to claim 9, wherein an area of each of the third holes in a plan view is smaller than an area of each of the first holes in a plan view.

11. The separation device according to claim 1,
wherein the first material is a plastic, and
the second material is a water-absorbent polymer.

12. The separation device according to claim 11,
wherein a weight ratio of the water-absorbent polymer adhering to the plastic immediately after processing by the separation device with respect to the plastic is 5% or less.

13. The separation device according to claim 1,
wherein the processing target is a disposable diaper.

* * * * *